(12) United States Patent
Schumacher et al.

(10) Patent No.: US 11,613,681 B2
(45) Date of Patent: Mar. 28, 2023

(54) USE OF COMPOUNDS HAVING N 2-OXO-1,3-DIOXOLANE-4-CARBOXAMIDE UNITS IN TWO-COMPONENT ADHESIVES

(71) Applicant: BASF SE, Ludwigshafen am Rhein (DE)

(72) Inventors: Karl-Heinz Schumacher, Ludwigshafen (DE); Thomas Fenlon, Ludwigshafen (DE); Sophie Putzien, Trostberg (DE); Nicolas Vautravers, Ludwigshafen (DE); Ulrike Licht, Ludwigshafen (DE)

(73) Assignee: BASF SE

( * ) Notice: Subject to any disclaimer, the term of this patent is extended or adjusted under 35 U.S.C. 154(b) by 914 days.

(21) Appl. No.: 16/306,174

(22) PCT Filed: May 29, 2017

(86) PCT No.: PCT/EP2017/062843
§ 371 (c)(1),
(2) Date: Nov. 30, 2018

(87) PCT Pub. No.: WO2017/207461
PCT Pub. Date: Dec. 7, 2017

(65) Prior Publication Data
US 2020/0339846 A1 Oct. 29, 2020

(30) Foreign Application Priority Data
Jun. 3, 2016 (EP) .................................. 16172975

(51) Int. Cl.
| | | |
|---|---|---|
| C09J 175/04 | (2006.01) | |
| C08G 71/04 | (2006.01) | |
| C08J 5/12 | (2006.01) | |
| C09J 5/06 | (2006.01) | |
| C08K 5/053 | (2006.01) | |
| C08K 5/17 | (2006.01) | |

(52) U.S. Cl.
CPC ............ C09J 175/04 (2013.01); C08G 71/04 (2013.01); C08J 5/121 (2013.01); C08J 5/124 (2013.01); C09J 5/06 (2013.01); C08K 5/053 (2013.01); C08K 5/17 (2013.01)

(58) Field of Classification Search
None
See application file for complete search history.

(56) References Cited

U.S. PATENT DOCUMENTS

| | | | | |
|---|---|---|---|---|
| 9,309,218 | B2 * | 4/2016 | Woelfle | ................. C07C 329/04 |
| 9,617,238 | B2 * | 4/2017 | Wölfle | ................. C07D 317/38 |
| 9,643,948 | B2 * | 5/2017 | Putzien | ................. C07D 317/36 |
| 10,590,227 | B2 * | 3/2020 | Putzien | ................. C08G 18/025 |
| 10,899,866 | B2 * | 1/2021 | Putzien | ................. C08G 18/246 |
| 2015/0051365 | A1 | 2/2015 | Woelfle et al. | |
| 2015/0353521 | A1 | 12/2015 | Woelfle et al. | |
| 2016/0145232 | A1 | 5/2016 | Putzien et al. | |
| 2017/0008871 | A1 * | 1/2017 | Putzien | ................. C07D 317/38 |
| 2017/0015883 | A1 | 1/2017 | Lammerschop et al. | |
| 2020/0165373 | A1 * | 5/2020 | Putzien | ................. C08G 18/025 |

FOREIGN PATENT DOCUMENTS

| | | |
|---|---|---|
| DE | 1 064 938 | 9/1959 |
| DE | 1 176 358 | 8/1964 |
| DE | 26 39 083 A1 | 3/1978 |
| DE | 27 37 951 A1 | 3/1979 |
| DE | 10 2014 206 574 A1 | 10/2015 |
| EP | 0 622 378 A1 | 11/1994 |
| EP | 2 998 331 A1 | 3/2016 |
| JP | 2012-111898 A | 6/2012 |
| WO | WO 2011/157551 A1 | 12/2011 |
| WO | WO 2013/092011 A1 | 6/2013 |
| WO | WO 2016/062424 A1 | 4/2016 |

OTHER PUBLICATIONS

International Search Report dated Aug. 10, 2017 in PCT/EP2017/062843 Filed on May 29, 2017.

* cited by examiner

*Primary Examiner* — Megan McCulley
(74) *Attorney, Agent, or Firm* — Faegre Drinker Biddle & Reath LLP

(57) ABSTRACT

A description is given of the use of compounds having n 2-oxo-1,3-dioxolane-4-carboxamide units as a reactive component in 2-component adhesives, especially for preparing hydroxypolyurethanes or hydroxypolycarbonates for adhesives applications, where n is a number greater than or equal to 2. A description is also given of corresponding two-component adhesives and adhesive bonding methods. Employed preferably as a second component of the two-component adhesive is a polyfunctional curing agent compound which is preferably selected from polyamines which have two or more amine groups and polyols which have two or more alcoholic hydroxyl groups.

9 Claims, No Drawings

USE OF COMPOUNDS HAVING N 2-OXO-1,3-DIOXOLANE-4-CARBOXAMIDE UNITS IN TWO-COMPONENT ADHESIVES

A description is given of the use of compounds having n 2-oxo-1,3-dioxolane-4-carboxamide units as a reactive component in 2-component adhesives, preferably for preparing hydroxypolyurethanes or hydroxypolycarbonates for adhesives applications. A description is also given of corresponding two-component adhesives and corresponding adhesive bonding methods. Employed preferably as a second component of the two-component adhesive is a polyfunctional hardener compound.

Frequently used as adhesives are two-component systems of polyurethanes based on polyisocyanates, in which isocyanate components react with polyol components to form a high molecular mass polyurethane polymer. These systems are applied either as solvent-free and water-free reactive one hundred percent systems, or as adhesive in solution in an organic solvent. The coating materials are applied by means of a suitable application system to a first substrate and then curing is carried out, optionally after evaporation of the solvent. An advantage are the resultant high bond strengths in combinations of a very wide variety of different film materials.

The reactive, monomeric, low molecular mass (poly) isocyanate compounds comprised in conventional two-component adhesives pose a toxicological risk, particularly if they are highly volatile or are able to migrate. This relates on the one hand to the processing of these adhesives in the context of their application, since the isocyanates generally have a high toxicity and a high allergenic potential. Secondly, the risk exists that in the case of flexible substrates, aromatic isocyanate which has not been fully consumed by reaction will migrate through the substrate, where it will be hydrolyzed by water fractions to form carcinogenic aromatic amines. The desire is therefore for isocyanate-free two-component systems for curable adhesive compositions, having exceptionally good bonding values and having good curing properties as far as possible even at room temperature.

Polyurethane systems can also be obtained starting from cyclic carbonate compounds, which are toxicologically unobjectionable. For example, glycerol carbonate (4-(hydroxymethyl)-2-oxo-1,3-dioxolane) finds application in cosmetics.

Disadvantages of the glycerol carbonate-based systems are the low regioselectivity, which leads to the reaction pathways A, B and C; the comparatively low reactivity of the systems at room temperature; and the fact that catalysts which accelerate the ring opening evidently also promote the reverse reaction, which can lead to partial decomposition of the products which have already formed.

WO 2011/157551 provides a partial solution to these problems by employing an ester group rather than an ether group in R. This electron-withdrawing group resulted in a considerable increase in the reaction rate and to a preference for the reaction pathway A. In the case of the secondary hydroxyurethanes [I] formed, no reverse reaction was observed. However, the production of adhesives comprising two or more 2-oxo-1,3-dioxolane-4-carboxyl groups in the molecule is difficult, since it involves a transesterification, where the cyclocarbonate ring as well may be attacked. It is also possible for said ester group to undergo partial attack during the reaction with the amines (R'—NH$_2$) that are used for curing.

WO 2013/092011 describes certain cyclocarbonate amides and their preparation.

The problem addressed by the present invention was that of substantially avoiding at least some of the disadvantages of the prior art as outlined above. Viewed generally, the intention was to provide an alternative 2-oxo-1,3-dioxolane system with an electron-withdrawing group for adhesives applications. More particularly the intention was to provide a 2-oxo-1,3-dioxolane system which is unobjectionable, readily accessible, and highly reactive with amines, which is able to cure as far as possible even at room temperature, and which, moreover, is suitable as an adhesive (having a bond to the polymer chain that is not very amenable to attack by amines) with good bonding values.

This problem has been solved with the features of the independent claims. The dependent claims relate to preferred embodiments.

A subject of the present invention is the use of compounds having n 2-oxo-1,3-dioxolane-4-carboxamide units as a reactive component in 2-component adhesives, preferably for preparing hydroxypolyurethanes or hydroxypolycarbonates for adhesives applications, where n is a number greater than or equal to 2. Preferably n is 2 to 5, more particularly 2 to 3.

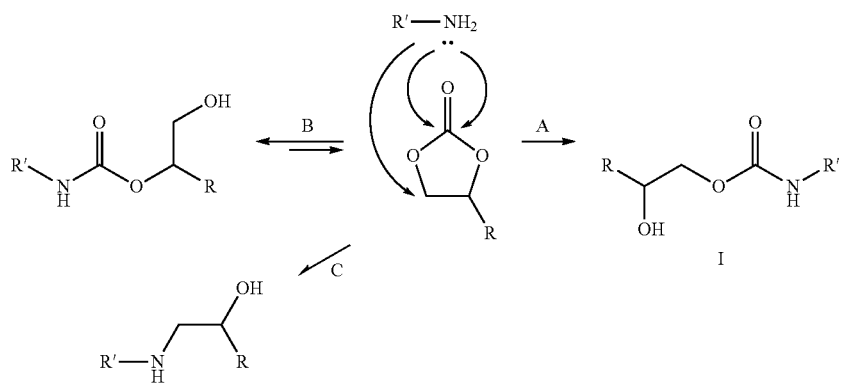

Cyclic carbonate compounds undergo a ring-opening reaction with amines to form products including hydroxyurethanes (see the formula scheme).

Suitable compounds having two or more 2-oxo-1,3-dioxolane-4-carboxamide units are, for example, those of the formula (I)

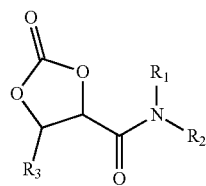

(I)

where $R_1$ and $R_3$ independently of one another are selected from H and an organic radical; and $R_2$ is an n-valent organic radical which is substituted by n−1 further 2-oxo-1,3-dioxolane-4-carboxamide groups, and n is a number greater than or equal to 2.

$R_1$ is preferably selected from H, straight-chain, branched or cyclic $C_{1-12}$ alkyl groups, $C_{6-10}$ aryl groups, $C_{6-12}$ arylalkyl groups, and $C_{6-12}$ alkylaryl groups.

$R_2$ is preferably an alkyl group having 2 to 22 C atoms, or a polymer chain; and it is preferably selected from the group consisting of linear or branched C2 to C22 alkylene groups; polyether groups of the general formula $-(A-O)_m-$, where A is C2 to C5 alkylene and m is a number from 1 to 100; polycarbonate groups, polyester groups, and poly(meth)acrylate groups.

$R_2$ is more preferably selected from n-alkyl units having 2-12 C atoms and from polymer chains which comprise ethylene oxide and/or propylene oxide units.

$R_3$ is preferably selected from H, aryl groups, and straight-chain, branched or cyclic $C_{1-12}$ alkyl groups which may also comprise O or N atoms; more preferably H.

The carbon atom to which $R_3$ is bonded may additionally carry a further $C_{1-12}$ alkyl group. The carbon atom in position 4 as well may additionally carry a $C_{1-12}$ alkyl group. Both may be the case simultaneously.

In the 2-oxo-1,3-dioxolane-4-carboxamides, the groups $R_1$ and $R_3$ are each preferably H.

The compounds have a functionality n in relation to the 2-oxo-1,3-dioxolane group of greater than or equal to 2. $R_2$ is an n-valent radical which is substituted by n−1 further 2-oxo-1,3-dioxolane-4-carboxamide groups, preferably by those of the general formula (II), where $R_3$ has the definition stated above.

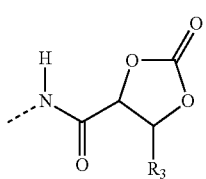

(II)

Preferably n is 2 to 5, more particularly 2 to 3.

The preparation of 2-oxo-1,3-dioxolane-4-carboxamides is described in WO 2013/092011 and in WO 2016/062424 (Pt-catalyzed oxidation with oxygen). Key products in the preparation of 2-oxo-1,3-dioxolane-4-carboxamides are the 2-oxo-1,3-dioxolane-4-carboxylic acids of the formula (VIII),

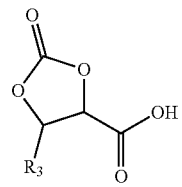

(VIII)

where $R_3$ has the definition stated above. The preparation of 2-oxo-1,3-dioxolane carboxylic acid of the formula (VIII) is described in WO 2013/092011.

The 2-oxo-1,3-dioxolane-4-carboxylic acid of the formula (VIII) may be reacted with a polyisocyanate having n NCO groups to give the corresponding amides, where n has the definition stated above, and n-functional 2-oxo-1,3-dioxolane-4-carboxamides are formed. The polyisocyanate is preferably an aliphatic isocyanate, an aromatic isocyanate, or a combined aliphatic/aromatic isocyanate having an NCO functionality (number of NCO groups in the molecule) n of 2 to 5, preferably 2 to 3.

Suitable polyisocyanates include tetramethylene 1,4-diisocyanate, 2-methylpenta-methylene 1,5-diisocyanate, hexamethylene 1,6-diisocyanate (HDI), 2,2,4- and 2,4; 4-trimethylhexamethylene 1,6-diisocyanate (TMDI), dodecamethylene 1,12-diisocyanate, lysine diisocyanate, lysine ester diisocyanate, 1-isocyanato-3,3,5-trimethyl-5-isocyanatomethylcyclohexane (isophorone diisocyanate, IPDI), 1,4-diisocyanato-2,2,6-trimethylcyclohexane (TMCDI), 2,2'-, 2,4'- and 4,4'-dicyclohexylmethane diisocyanate ($H_2MDI$), cyclohexane 1,3-diisocyanate, cyclohexane 1,4-diisocyanate (CHDI), 1,3-bis-(isocyanatomethyl)cyclohexane, 1,4-bis(isocyanatomethyl)cyclohexane, 2,2-bis(4-isocyanatocyclohexyl)propane, m- and p-phenylene diisocyanate, 2,3,5,6-tetramethyl-1,4-diisocyanatobenzene, 3,3'-dimethyl-4,4'-diisocyanatobiphenyl (TODI), 2,4- and 2,6-tolylene diisocyanate (TDI), 2,2'-, 2,4'-, and 4,4'-diphenylmethane diisocyanate (MDI), naphthalene 1,2-diisocyanate and naphthalene 1,5-diisocyanate (NDI), m- and p-xylylene diisocyanate (XDI), tetramethylxylylene diisocyanate (TMXDI), and also any desired mixtures of the aforesaid isocyanates.

For the purposes of the present invention, the polyisocyanates of the invention also include dimers (uretdiones) and trimers (isocyanurates). Particularly important in this context is the HDI trimer. The intention is also to include oligomers, such as, for example, "polymeric MDI", with n being preferably 1 to 8:

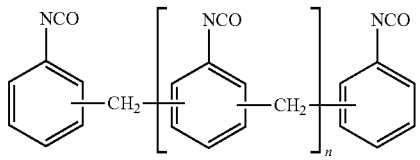

Furthermore, it is also possible to use prepolymers of polyisocyanates with polyols, provided there is a stoichiometric excess of NCO groups. Suitable polyols include polyoxyalkylene polyols (also called "polyether polyols"), which among others may comprise ethylene oxide, propylene oxide, and butylene oxide units, and aliphatic diols, aliphatic polyols, polyester polyols, polycarbonate polyols, castor oil, hydroxylated epoxidized soybean oil, and also mixtures of the stated polyols.

A nonconclusive overview, given by way of example, of reaction products of 2-oxo-1,3-dioxolane-4-carboxylic acid with polyisocyanates is given by the formula scheme below:

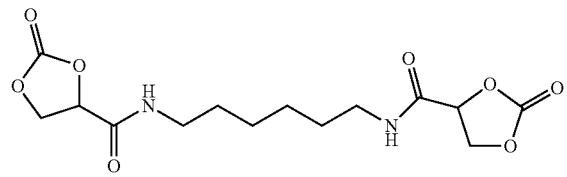

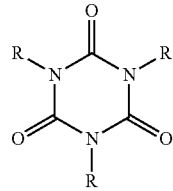

R =

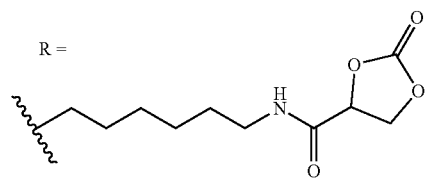

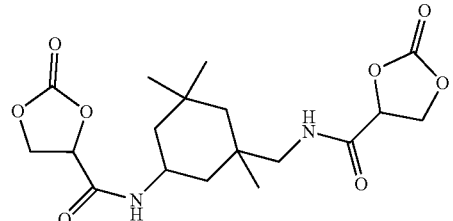

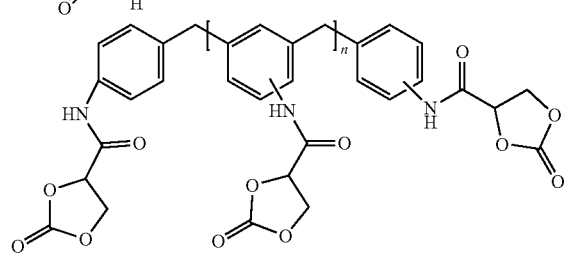

where n is a number from 0 to 8, preferably from 1 to 8.

Preferred compounds having n 2-oxo-1,3-dioxolane-4-carboxamide units are selected from the group consisting of compounds of the formula (III)

(III)

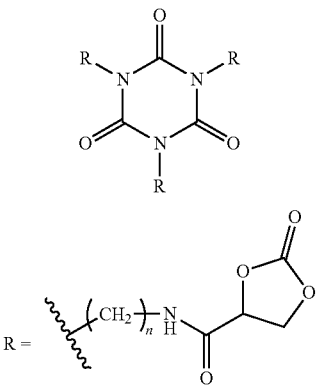

where n is a number from 1 to 12;

compounds of the formula (IV)

(IV)

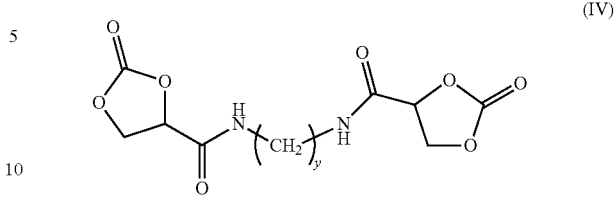

where y is a number from 1 to 12;
compounds of the formula (V)

(V)

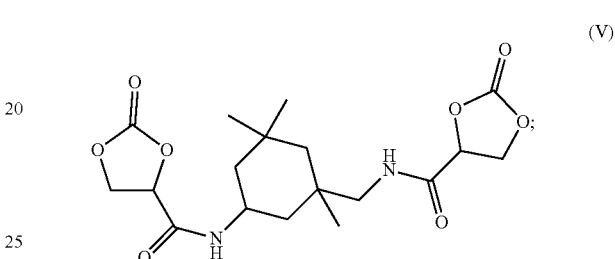

and
compounds of the formula (VI)

(VI)

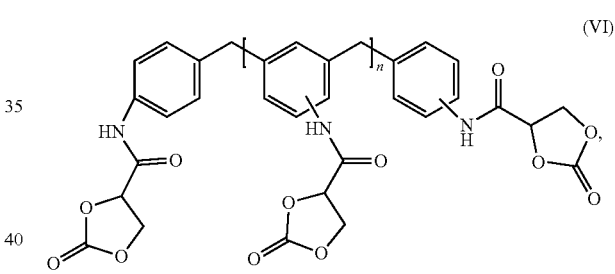

where n is a number greater than or equal to 0, preferably 1 to 8.

Another subject of the invention are polyfunctional 2-oxo-1,3-dioxolane-4-carboxamides particularly suitable for adhesives applications, with a flexible spacer group between the cyclocarbonate units, of the formula (I) where (I)

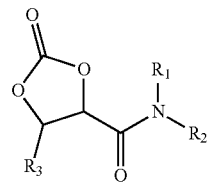

$R_1$ and $R_3$ independently of one another are selected from H and an organic radical; and $R_2$ is an n-valent organic radical which is substituted by n−1 further 2-oxo-1,3-dioxolane-4-carboxamide groups, n is a number greater than or equal to 2, and where between the 2-oxo-1,3-dioxolane-4-carboxamide groups there is at least one linear or branched spacer group, and the spacer group has a molecular weight of at least 200 g/mol and is preferably selected from alkylene groups, polyether groups, polycarbonate groups, polyester groups, and poly(meth)acrylate groups.

$R_2$ in formula (I) is preferably selected from the group consisting of linear or branched $C_2$ to $C_{22}$ alkylene groups; polyether groups of the general formula $-(A-O)_m-$, where A is $C_2$ to $C_5$ alkylene and m is a number from 1 to 100; polycarbonate groups; polyester groups; and poly(meth)acrylate groups.

Particularly preferred 2-oxo-1,3-dioxolane-4-carboxamides are selected from compounds of the formula (IV)

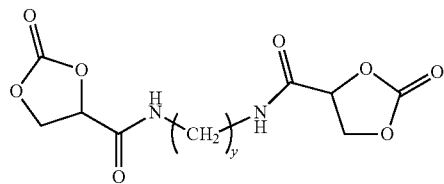

(IV)

where y is a number from 1 to 12;
and compounds of the formula (VII)

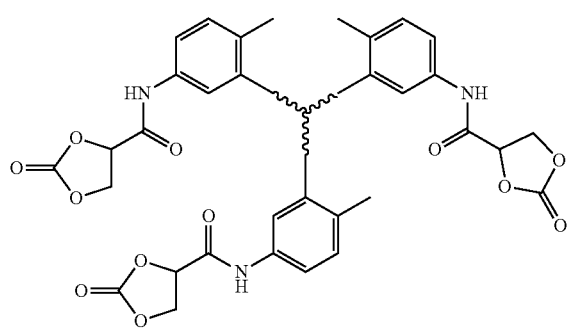

(VII)

where

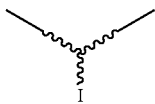

is an alkoxylated glycerol radical having preferably 2 to 5, more particularly 2 and/or 3, C atoms in the alkoxy group, more preferably ethoxylated/propoxylated glycerol.

In the case of use in accordance with the invention, the 2-oxo-1,3-dioxolane carboxamides react with amine hardeners to give hydroxypolyurethanes. The predominant products here are hydroxypolyurethanes having secondary hydroxyl groups, since on the attack of the nucleophilic nitrogen atom, the negative charge on the oxygen atom which lies closer to the $CONR_1R_2$ group is better stabilized, Hydroxyurethanes having secondary hydroxyl groups have the advantage that there is no reverse reaction. Attack of the amine on the amide group would also be conceivable theoretically. It has, however, been shown that the amine attacks only the 2-oxo-1,3-dioxolane group.

Amines suitable in this context include primary and secondary amines having alkyl groups, aryl groups, aralkyl groups and also alkaryl groups as radicals. Primary amines react faster than secondary amines; aliphatic amines react faster than aromatic amines. Especially suitable here are polyamines of relatively high molecular mass, such as Jeffamine® products from Huntsman Corp. and Polyetheramines from BASF SE.

In the case of primary amines having the formula $R'-NH_2$, the reaction may be represented as follows, the only reaction shown here being the preferred reaction to form the hydroxyurethane having a secondary hydroxyl group:

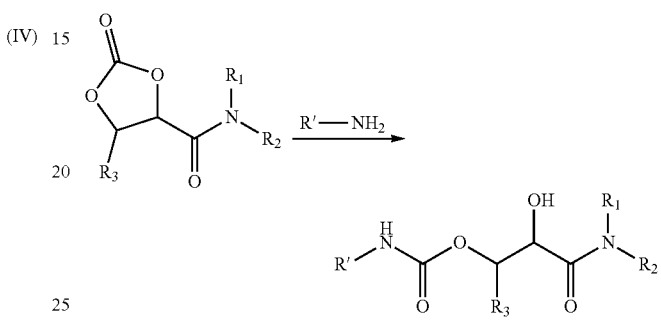

In the case of use in accordance with the invention, the 2-oxo-1,3-dioxolane carboxamides react with hydroxy hardeners to form hydroxypolycarbonates. The formula scheme below shows only the preferred reaction to form the hydroxycarbonate having a secondary hydroxyl group. Examples of suitable alcohols of the formula $R'-OH$ are the polyols stated above.

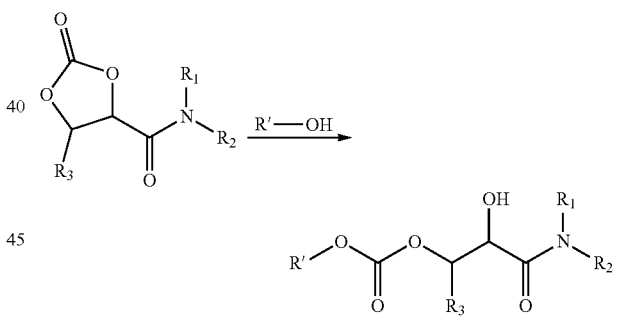

Blends of the compounds having 2 or more 2-oxo-1,3-dioxolane-4-carboxamide units with a suitable polyfunctional hardener compound may be employed as a two-component adhesive, with the 2-oxo-1,3-dioxolane-4-carboxamide compound in a first component and with the polyfunctional hardener compound in a second component. The polyfunctional hardener component has at least two functional groups, selected from the group consisting of primary amino groups, secondary amino groups, and hydroxyl groups. The two-component adhesive preferably comprises at least one catalyst for catalyzing the reaction of the cyclocarbonate groups with the functional groups of the hardener.

It is also possible to use mixtures of different hardener compounds: for example, a small amount of a "fast" hardener, which develops instantaneous strength without too greatly reducing the pot life of the adhesive, plus a slow hardener for the ultimate, complete cure.

The two-component adhesive may be applied in the form of a solution in an organic solvent or in the form of a solvent-free and water-free one hundred percent system.

The functional groups of the hardener are preferably selected from aliphatic hydroxyl groups, aliphatic primary amino groups, and aliphatic secondary amino groups.

A two-component adhesive is an adhesive which comprises at least two polyfunctional adhesive constituents which react with one another in a bond-forming reaction and form a polymeric network. Accordingly, two-component adhesive compositions, as well as at least one polyfunctional cyclocarbonate amide compound, additionally comprise at least one compound which has at least 2 functional groups F, e.g., 2, 3, 4, 5, 6, 7, 8, 9 or 10 functional groups F, which are selected preferably from aliphatic hydroxyl groups, aliphatic primary or secondary amino groups. These compounds are also referred to below as hardeners. The amount of hardener is preferably selected such that the molar ratio of functional 2-oxo-1,3-dioxolane groups to the functional groups F in the hardener is in the range from 1:10 to 10:1, more particularly in the range from 5:1 to 1:5, and especially in the range from 1:2 to 2:1.

The hardener may be a substance of low molecular mass, meaning that its molecular weight is below 500 g/mol, or may be an oligomeric or polymeric substance, having a number-average molecular weight of more than 500 g/mol.

For particularly good bonding effects it is preferred for either the compound having two or more 2-oxo-1,3-dioxolane-4-carboxamide units, or the hardener compound, or both, to comprise at least one flexible spacer group. A flexible spacer group is a linear or branched joining group which has a molecular weight of at least 200 g/mol. The spacer group may form the group $R_2$ or a part of the group $R_2$ in formula (I) and/or the spacer group may be located between two functional groups of the hardener. The spacer group is preferably selected from alkylene groups, polyether groups, polycarbonate groups, polyester groups, and poly(meth)acrylate groups.

Spacer groups are, for example, linear or branched alkylene groups having at least 15 C atoms; polyether groups of the general formula -(A-O)$_m$—, where A is C2 to C5 alkylene and m is a number selected such that the molecular weight of -(A-O)$_m$— is at least 200 g/mol; polycarbonate groups: polyester groups; and poly(meth)acrylate groups. A preferred spacer group is alkoxylated glycerol, e.g. ethoxylated glycerol, propoxylated glycerol, and ethoxylated/propoxylated glycerol.

The aminic hardeners, also amine hardeners hereinafter, include, for example, aliphatic and cycloaliphatic polyamines, aromatic and araliphatic polyamines and polymeric amines, for example amino resins and polyamidoamines. Amine hardeners crosslink polymers having 1,3-dioxolan-2-one groups, also called carbonate polymers hereinafter, by reaction of the primary or secondary amino functions of the polyamines with the 1,3-dioxolan-2-one groups of the carbonate polymers to form urethane functions. Preferred polyamine hardeners have an average of at least two primary or secondary amino groups per molecule, for example two, three or four primary or secondary amino groups per molecule. They may also additionally comprise one or more tertiary amino groups. Suitable polyamines are, for example, aliphatic polyamines such as ethylenediamine, 1,2- and 1,3-propanediamine, neopentanediamine, hexamethylenediamine, octamethylenediamine, 1,10-diamino-decane, 1,12-diaminododecane, diethylenetriamine, triethylenetetramine, tetraethylenepentamine, 2,2-dimethylpropylenediamine, trimethylhexamethylenediamine, 1-(3-aminopropyl)-3-aminopropane, 1,3-bis(3-aminopropyl)propane, 4-ethyl-4-methylamino-1-octylamine, and the like;

cycloaliphatic diamines, such as 1,2-diaminocyclohexane, 1,2-, 1,3-, 1,4-bis(amino-methyl)cyclohexane, 1-methyl-2,4-diaminocyclohexane, N-cyclohexylpropylene-1,3-diamine, 4-(2-aminopropan-2-yl)-1-methylcyclohexane-1-amine, isophoronediamine, 4,4'-diaminodicyclohexylmethane, 3,3'-dimethyl-4,4'-diaminodicyclohexylmethane, 3,3',5,5'-tetramethyl-4,4'-diaminodicyclohexylmethane, 4,8-diaminotricyclo[5.2.1.0]decane, norbornanediamine, menthanediamine, menthene-diamine, and the like;

aromatic diamines, such as tolylenediamine, xylylenediamine, especially meta-xylylenediamine (MXDA), bis(4-aminophenyl)methane (MDA or methylene-dianiline), bis(4-aminophenyl) sulfone (also known as DADS, DDS or dapsone), and the like;

cyclic polyamines, such as piperazine, N-aminoethylpiperazine, and the like;

polyetheramines, especially difunctional and trifunctional primary polyetheramines based on polypropylene glycol, polyethylene glycol, polybutylene oxide, poly(1,4-butanediol), polytetrahydrofuran (polyTHF) or polypentylene oxide, for example 4,7,10-trioxatridecane-1,3-diamine, 4,7,10-trioxatridecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (from BASF SE), 1,3-diamino-4,7,10-trioxatridecane (from BASF SE), primary polyetheramines based on polypropylene glycol having a mean molar mass of 230, for example Polyetheramine D 230 (from BASF SE) or Jeffamine® D 230 (from Huntsman), difunctional, primary polyetheramines based on polypropylene glycol having a mean molar mass of 400, e.g. Polyetheramine D 400 (from BASF SE) or Jeffamine® XTJ 582 (from Huntsman), difunctional, primary polyetheramines based on polypropylene glycol having a mean molar mass of 2000, for example Polyetheramine D 2000 (from BASF SE), Jeffamine® D2000 or Jeffamine® XTJ 578 (each from Huntsman), difunctional, primary polyetheramines based on propylene oxide having a mean molar mass of 4000, for example Polyetheramine D 4000 (from BASF SE), trifunctional, primary polyetheramines prepared by reacting propylene oxide with trimethylolpropane, followed by an amination of the terminal OH groups, having a mean molar mass of 403, for example Polyetheramine T 403 (from BASF SE) or Jeffamine® T 403 (from Huntsman), trifunctional, primary polyetheramine prepared by reacting propylene oxide with glycerol, followed by an amination of the terminal OH groups, having a mean molar mass of 5000, for example Polyetheramine T 5000 (from BASF SE) or Jeffamine® T 5000 (from Huntsman), aliphatic polyetheramines formed from a propylene oxide-grafted polyethylene glycol and having a mean molar mass of 600, for example Jeffamine® ED-600 or Jeffamine® XTJ 501 (each from Huntsman), aliphatic polyetheramines formed from a propylene oxide-grafted polyethylene glycol and having a mean molar mass of 900, for example Jeffamine® ED-900 (from Huntsman), aliphatic polyetheramines formed from a propylene oxide-grafted polyethylene glycol and having a mean molar mass of 2000, for example Jeffamine® ED-2003 (from Huntsman), difunctional, primary polyetheramine prepared by amination of a propylene oxide-grafted diethylene glycol, having a mean molar mass of 220, for example Jeffamine® HK-511 (from Huntsman), aliphatic polyetheramines based on a copolymer of poly(tetramethylene ether glycol) and polypropylene glycol having a mean molar mass of 1000, for example Jeffamine® XTJ-542 (from Huntsman), aliphatic polyetheramines based on a copolymer of poly(tetramethylene ether glycol) and polypropylene glycol having a mean molar mass of 1900, for example Jeffamine® XTJ-548 (from Huntsman), aliphatic polyetheramines based on a copolymer of poly(tetramethylene ether glycol) and polypropylene glycol having a mean molar mass of 1400, for example Jeffamine® XTJ-559 (from Huntsman), polyethertriamines based on a butylene oxide-grafted, at least trihydric alcohol having a mean molar mass of 400, for example Jeffamine® XTJ-566 (from Huntsman), aliphatic polyetheramines prepared by amination of butylene oxide-grafted alcohols having a mean molar mass of 219, for example Jeffamine® XTJ-568 (from Huntsman), polyetheramines based on pentaerythritol and propylene oxide having a mean molar mass of 600, for example Jeffamine® XTJ-616 (from Huntsman), polyetheramines based on triethylene glycol having a mean molar mass of 148, for example Jeffamine® EDR-148 (from Huntsman), difunctional, primary polyetheramines prepared by amination of a propylene oxide-grafted ethylene glycol, having a mean molar mass of 176, for example Jeffamine® EDR-176 (from Huntsman), and also polyetheramines prepared by amination of polytetrahydrofuran (polyTHF) having a mean molar mass of 250, for example PolyTHF-Amine 350 (from BASF SE), and mixtures of these amines;

polyamidoamines (amidopolyamines), which are obtainable by reaction of dimeric fatty acids (for example dimeric linoleic acid) with polyamines of low molecular weight, such as diethylenetriamine, 1-(3-aminopropyl)-3-aminopropane or triethylenetetramine, or other diamines, such as the aforementioned aliphatic or cycloaliphatic diamines;

adducts obtainable by reaction of amines, especially diamines, with a deficiency of epoxy resin or reactive diluent, preference being given to using those adducts in which about 5% to 20% of the epoxy groups have been reacted with amines, especially diamines;

phenalkamines as known from epoxide chemistry;

Mannich bases which are prepared, for example, by condensation of polyamines, preferably diethylenetriamine, triethylenetetramine, isophoronediamine, 2,2,4- or 2,4,4-trimethylhexamethylenediamine, 1,3- and 1,4-bis(aminomethyl)cyclohexane, with aldehydes, preferably formaldehyde, and mono- or polyhydric phenols having at least one aldehyde-reactive ring location, for example the various cresols and xylenols, p-tert-butylphenol, resorcinol, 4,4'-dihydroxydiphenylmethane, 4,4'-dihydroxydiphenyl-2,2-propane, but preferably phenol;

and mixtures of the aforementioned amine hardeners, especially mixtures of difunctional amines from the group of the aliphatic, cycloaliphatic and aromatic amines with the aforementioned polyetheramines.

Preferred aminic hardeners are aliphatic polyamines, especially 2,2-dimethylpropylenediamine, aromatic diamines, especially m-xylylenediamine (MXDA) and cycloaliphatic diamines, especially isophoronediamine, N-cyclohexylpropylene-1,3-diamine and 4,4'-diaminodicyclohexylmethane (Dicykan). Preference is also given to difunctional or trifunctional primary polyetheramines based on polypropylene glycol, for example Jeffamine® D 230 or Jeffamine® T 403. Particular preference is given to polyamines in which there is high mobility and low steric hindrance around the amino group, for example 4,9-dioxadodecane-1,12-diamine, 4,7,10-trioxatridecane-1,13-diamine, PolyTHF Amine 350 (BASF SE).

Preference is also given to mixtures of the amines specified as preferred, for example mixtures comprising 2,2-dimethylpropyleneamine and isophoroneamine.

The alcoholic hardeners include particularly aliphatic and cycloaliphatic alcohols of low molecular weight and higher molecular weight. Alcoholic hardeners crosslink to carbonate polymers by reaction of the primary or secondary alcohol functions with the 1,3-dioxolan-2-one groups to form diesters of carbonic acid. Preferred alcoholic hardeners have an average of at least two primary or secondary hydroxyl groups per molecule, for example two, three or four primary or secondary hydroxyl groups per molecule. Suitable alcoholic hardeners of low molecular weight are, for example, butane-1,4-diol, ethylene glycol, diethylene glycol, triethylene glycol, neopentyl glycol, propane-1,3-diol, pentane-1,5-diol, hexane-1,6-diol, glycerol, diglycerol, pentaerythritol, dipentaerythritol, sugar alcohols such as sorbitol and mannitol.

Suitable alcoholic hardeners are also higher molecular weight polymeric polyols, for example polyester polyols, polycarbonate polyols, polyether polyols, polyacrylate polyols and polyvinyl alcohols. Suitable polymeric polyol hardeners preferably have a mean OH functionality of at least 1.5 mol and especially at least 1.8, for example in the range from 1.5 to 10 and especially in the range from 1.8 to 4. The mean OH functionality is understood to mean the mean number of OH groups per polymer chain. Typical polymeric polyol components preferably have a number-average molecular weight of about 250 to 50 000 g/mol, preferably of about 500 to 10 000 g/mol.

Preferably, at least 50 mol % of the hydroxyl groups present in the polymeric polyol component are primary hydroxyl groups.

Preferably, polyester polyols are linear or branched polymeric compounds having ester groups in the polymer backbone and having free hydroxyl groups at the ends of the polymer chain. Preferably, these are polyesters which are obtained by polycondensation of dihydric alcohols with dibasic carboxylic acids, optionally in the presence of higher polyhydric alcohols (e.g. tri-, tetra-, penta- or hexahydric alcohols) and/or higher polybasic polycarboxylic acids. Rather than the free di- or polycarboxylic acids, it is also possible to use the corresponding di- or polycarboxylic anhydrides or corresponding di- or polycarboxylic esters of lower alcohols or mixtures thereof for preparation of the polyester polyols. The di- or polycarboxylic acids may be aliphatic, cycloaliphatic, araliphatic, aromatic or heterocyclic, preferably have 2 to 50 and especially 4 to 20 carbon atoms and may optionally be substituted, for example by halogen atoms, and/or be unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydro-phthalic anhydride, glutaric anhydride, maleic acid, maleic anhydride, alkenylsuccinic acid, fumaric acid and dimeric fatty acids. Useful diols for the preparation of the polyester polyols include especially aliphatic and cycloaliphatic diols having preferably 2 to 40 and especially 2 to 20 carbon atoms, for example ethylene glycol, propane-1,2-diol, propane-1,3-diol, butane-1,3-diol, butane-1,4-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methyl propane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preference is given to alcohols of the general formula HO—$(CH_2)_x$—OH, where x is a number from 2 to 20, preferably an even number from 2 to 12. Examples thereof are ethylene glycol, butane-1,4-diol, hexane-1,6-diol, octane-1,8-diol and dodecane-1,12-diol. Additionally preferred are neopentyl glycol and pentane-1,5-diol.

Suitable alcoholic hardeners are also lactone-based polyester polyols, these being homo- or copolymers of lactones, preferably terminal hydroxyl-containing addition products of lactones onto suitable difunctional starter molecules. Useful lactones are preferably those which derive from compounds of the general formula HO—$(CH_2)_z$—COOH where z is a number from 1 to 20 and one hydrogen atom of one methylene unit may also be substituted by a $C_1$-$C_4$-alkyl radical. Examples are ε-caprolactone, β-propiolactone, γ-butyrolactone and/or methyl-ε-caprolactone and mixtures thereof. Suitable starter molecules are, for example, the low molecular weight dihydric alcohols mentioned above as a formation component for the polyester polyols. The corresponding polymers of ε-caprolactone are particularly preferred. It is also possible to use lower polyester diols or polyether diols as starters for preparation of the lactone polymers. Rather than the polymers of lactones, it is also possible to use the corresponding chemically equivalent polycondensates of the hydroxycarboxylic acids corresponding to the lactones.

Examples of suitable polyester polyols are, for example, the polyester polyols known from Ullmanns Enzyklopädie der Technischen Chemie, 4th Edition, Volume 19, pages 62 to 65.

In addition, polycarbonate polyols are also useful, as obtainable, for example, by reaction of phosgene with an excess of the low molecular weight alcohols mentioned as formation components for the polyester polyols.

The polyether polyols are especially polyether polyols preparable by polymerization of ethylene oxide, propylene oxide, butylene oxide, tetrahydrofuran, styrene oxide or epichlorohydrin with themselves, for example in the presence of $BF_3$ or by addition of these compounds, optionally in a mixture or in succession, onto bi- or polyfunctional starter components having reactive hydrogen atoms, such as polyols or polyfunctional amines, for example water, ethylene glycol, propane-1,2-diol, propane-1,3-diol, 1,1-bis(4-hydroxyphenyl)propane, trimethylolpropane, glycerol, sorbitol, ethanolamine or ethylenediamine. Also useful are sucrose polyethers (see DE 1176358 and DE 1064938), and formitol- or formose-started polyethers (see DE 2639083 and DE 2737951).

Likewise suitable are polyhydroxy olefins, preferably those having 2 terminal hydroxyl groups, e.g. α,ω-dihydroxypolybutadiene.

Likewise suitable are polyhydroxypolyacrylates, where the hydroxyl groups may be arranged laterally or terminally. Examples thereof are α, ω-dihydroxypoly(meth)acrylic esters obtainable by homo- or copolymerization of alkyl esters of acrylic acid and/or of methacrylic acid in the presence of regulators comprising OH groups, such as mercaptoethanol or mercaptopropanol, and subsequent transesterification with a low molecular weight polyol, for example an alkylene glycol such as butanediol. Such polymers are known, for example, from EP-A 622 378. Examples thereof are additionally polymers obtainable by copolymerization of alkyl esters of acrylic acid and/or of methacrylic acid with hydroxyalkyl esters of ethylenically unsaturated carboxylic acid such as hydroxyethyl acrylate, hydroxypropyl acrylate, hydroxybutyl acrylate, hydroxyethyl methacrylate, hydroxypropyl methacrylate or hydroxybutyl methacrylate.

Also suitable are polyvinyl alcohols, which can preferably be obtained by full or partial hydrolysis of polyvinyl esters, especially polyvinyl acetate. If the polyvinyl esters, preferably polyvinyl acetate, are in partly hydrolyzed form, preferably not more than 50% to 95% of the ester groups are in hydrolyzed form as hydroxyl groups. If the polyvinyl esters, preferably polyvinyl acetate, are in fully hydrolyzed form, generally more than 95% up to 100% of the ester groups are in hydrolyzed form as hydroxyl groups.

Alcoholic hardeners preferred among the higher molecular weight polymeric polyols are especially polyacrylate polyols, these being obtainable, for example, under the Joncryl® brand name from BASF SE, e.g. Joncryl® 945.

Suitable hardeners are also amino acids, for example lysine, arginine, glutamine and asparagine, and the stereoisomers thereof and mixtures thereof.

It is of course also possible to use mixtures of different hardeners, for example mixtures of one or more aminic hardeners with one or more alcoholic hardeners, mixtures of one or more aminic hardeners with one or more amino acids, or mixtures of one or more alcoholic hardeners with one or more amino acids.

In the adhesive compositions of the invention, the total amount of hardeners is preferably 0.1% by weight to 50% by weight, frequently 0.5% to 40% by weight and especially 1% to 30% by weight, based on the total amount of cyclocarbonate compounds plus hardeners used.

The adhesive composition can be cured thermally by heating the mixture of polymer of the invention and hardener to a temperature above the mixing temperature. The curing can also be effected at lower temperatures. Typically, the adhesive compositions of the invention are cured at temperatures in the range from −10° C. to 150° C., preferably in the range from 0 to 100° C. and especially in the range from 10 to 70° C. Curing at temperatures of 20-30° C. is especially advantageous. The temperature which is suitable depends on the respective hardeners and the desired cure rate, and can be determined in the individual case by the person skilled in the art, for example by simple preliminary tests. In the lower temperature range (5 to approx. 35° C.), which indeed corresponds to the usually prevailing ambient temperature, it is of course sufficient to mix polymer of the invention and hardener. Alternatively, the ent is preferably microwave-induced.

The two-component adhesive compositions may also comprise one or more suitable catalysts for the curing, which are guided in a known manner by the nature of the reactive functional groups F. The catalysts are, if desired, used in proportions of 0.01% by weight to about 10% by weight, based on the total weight of the polymers of the invention having functional alkylidene-1,3-dioxolan-2-one groups of the formula I and of the hardener. In one configuration, no catalysts are required, particularly in the case of hardeners which have amino groups as functional groups, which means that the content of catalysts in the composition in that case is less than 0.01% by weight. Catalysts are used with preference when the hardener has reactive groups F other than amino groups, especially when the hardener has hydroxyl groups.

Catalysts used with preference are basic catalysts, more preferably organic amines and organic phosphines. Among the organic amines, preference is given to amidine bases, for example 1,8-diazabicyclo[5.4.0]undec-7-ene (DBU) and 1,5-diazabicyclo[4.3.0]non-5-ene (DBN), and to mono-$C_1$-$C_6$-alkyl-, di-$C_1$-$C_6$-alkyl- and tri-$C_1$-$C_6$-alkylamines, especially triethylamine and tert-butylamine. Among the organic phosphines, preference is given to trialkylphosphines and triarylphosphines, for example tri-n-butylphosphine and triphenylphosphine. The catalysts can of course also be used as mixtures, optionally in combination with tri-$C_1$-$C_6$-alkylammonium halides and copper salts, for example triphenylphosphine in combination with a tri-$C_1$-$C_6$-alkylammonium halide and a copper salt, e.g. copper(I) chloride, copper(I) bromide, copper(II) chloride or copper(II) sulfate.

As well as the aforementioned constituents, the adhesive composition may comprise the additives customary therefor. The choice of suitable conventional additives for the composition of the invention depends on the particular end use and can be determined in the individual case by the person skilled in the art.

Suitable additives comprise, for example, antioxidants, UV absorbers/light stabilizers, metal deactivators, antistats, reinforcers, fillers, antifogging agents, biocides, plasticizers, lubricants, emulsifiers, colorants, pigments, rheology agents, adhesion regulators, optical brighteners, flame retardants, antidripping agents, nucleating agents, wetting agents, thickeners, protective colloids, defoamers, tackifiers, solvents and reactive diluents, and mixtures thereof.

Any light stabilizers/UV absorbers, antioxidants and metal deactivators used preferably have a high migration stability and thermal stability. They are selected, for example, from groups a) to t). The compounds of groups a) to g) and i) are light stabilizers/UV absorbers, while compounds j) to t) act as stabilizers.

a) 4,4-diarylbutadienes,
b) cinnamic esters,
c) benzotriazoles,
d) hydroxybenzophenones,
e) diphenyl cyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thio synergists,
r) peroxide-destroying compounds,
s) polyamide stabilizers and
t) basic costabilizers.

The two-component adhesive is preferably free of isocyanates, meaning that it preferably does not comprise any isocyanate compounds as hardeners. The two-component adhesive is preferably either in the form of a solution in an organic solvent or is solvent-free. "Solvent-free" means that less than 5% by weight, more preferably less than 2% by weight or zero organic solvent or water is present.

The two-component adhesive of the invention is capable of developing high binding forces even at room temperature in a short time and in particular with amine hardeners.

Another subject of the invention is a two-component adhesive comprising as reactive first component the at least one compound having n 2-oxo-1,3-dioxolane carboxamide units, described in greater detail above; and as second component (hardener) the at least one compound selected from polyamines and polyols that is described in greater detail above;

where n is a number greater than or equal to 2;
the polyamines have two or more amine groups; and
the polyols have two or more alcoholic hydroxyl groups.

The two-component adhesive, after the mixing of the components, has a Brookfield viscosity at temperatures of 70° C. or below, preferably at temperatures of 40° C. or below, more preferably at temperatures of 23° C. or below, of preferably less than 10 000 mPa s (Brookfield LVT, measured at 12 rpm with spindle 3)

The two-component adhesive has a bond strength of preferably greater than 1.5 N/15 mm, measured as the peel strength of two polyester films bonded to one another with a 3 μm layer of adhesive and with an applied pressure of 3 bar, after 24 hours.

Another subject of the invention is an adhesive bonding method wherein two substrates are bonded to one another and to the surface of at least one of the substrates a 2-component adhesive is applied which comprises at least one of the compounds described in greater detail above and having n 2-oxo-1,3-dioxolane-4-carboxamide units as a reactive component; and n is a number greater than or equal to 2.

Preferred applications and preferred bonding methods are those of composite film lamination, high-gloss film lamination, and the lamination of moldings, as is used, in particular, in the context of furniture lamination or of the lamination of automotive interior components.

Another subject of the invention is a laminating method for producing laminated articles selected from high-gloss films, composite films, and laminated moldings, where
a) a first substrate is provided in the form of a first film,
b) a second substrate is provided, selected from paper, a second film, and moldings,
c) a two-component adhesive of the invention described in more detail above is provided, and
d) the two-component adhesive is applied to the first substrate and/or to the second substrate, and is optionally allowed to dry, and the first substrate is laminated onto the second substrate, it being possible for the lamination to take place with thermal activation.

The first film is preferably selected from polymeric films and aluminum films (foils), and the polymeric films may also have been metallized.

Lamination takes place preferably with pressure and/or an increase in temperature, especially by thermal activation.

At least one of the substrates may have been metallized or printed on the side coated with the adhesive.

Another subject of the invention are film-laminated articles produced by the laminating method of the invention, the film material being preferably selected from the group consisting of polyvinyl chloride, which may also comprise plasticizers, and thermoplastic polyolefin (TPO) and combinations thereof.

The films used are often polymeric decorative films and may have a surface structure. This surface structure on the polymeric film may be introduced by embossing, for example, before, during or after adhesive bonding.

A surface treatment of the film substrates is not absolutely necessary prior to the coating with the two-component adhesive. Better results can, however, be obtained if the surface of the film substrates is modified prior to the coating. In this case, it is possible to employ standard surface treatments, for example corona treatment to enhance the adhesion effect. The polymer film preferably has hydrophilic groups on the surface which comes into contact with the adhesive. Hydrophilic groups are, for example, oxygen-containing groups, examples being OH groups, or acid groups. The hydrophilic groups are generated preferably by corona treatment in order to reinforce the adhesion effect. The corona treatment or other surface treatments are conducted to the degree required for sufficient wettability with the coating composition. Typically, a corona treatment of about 10 watts per square meter per minute is sufficient for this purpose. Alternatively or additionally, it is optionally also possible to use primers or intermediate layers between film substrate and adhesive coating and/or molding substrate.

In addition, the films may have further, additional functional layers, for example barrier layers, printed layers, ink or varnish layers or protective layers. The functional layers may be on the outside, i.e. on the opposite side of the film substrate from the adhesive-coated side, or on the inside, between film substrate and adhesive layer.

The lamination of moldings pertains to the production of composite bodies by longlasting adhesive bonding of flexible films of high surface area on solid (three-dimensionally shaped, dimensionally stable, nonflexible) moldings as substrate. The flexible films are selected more particularly from polymer films and metal films. They are bonded to the solid moldings, for example to shaped parts made of metal, coated metal, wood, woodbase materials, fiber materials or plastic. The shaped parts may comprise furniture or components of furniture, i.e., constituents of furniture, or automotive interior components.

In one embodiment, the laminated moldings in question are film-coated furniture items. The film-coated furniture produced in accordance with the invention comprises composite bodies. The composite bodies may additionally have primer layers for improving adhesion between film and layer of adhesive and/or between substrate and layer of adhesive. The films and substrates to be bonded may have been pretreated with adhesion promoters. Because the adhesion properties of adhesives of the invention are already good; however, there is no absolute need for primers to be employed. The furniture components may also be shaped parts made of synthetic or natural fibers or chips, bound by a binder to form a shaped part. The shaped parts may have any desired shape. Particularly preferred are MDF boards (medium-density wood fiberboards).

In the production of film-laminated shaped parts for automobile construction, lamination takes place onto a shaped part intended for installation in an automobile. The shaped parts may also be shaped parts made of synthetic or natural fibers or chips, bound by a binder to form a shaped part; also suitable in particular are shaped parts made of plastic, e.g., ABS. The shaped parts may have any desired shape.

Films particularly preferred as first substrate are polymer films. Polymer film refers in particular to flexible sheetlike plastics in a thickness of 0.05 millimeters to 5 millimeters, preferably of 0.25 to 1 mm, which can be rolled up. This therefore includes not only "films" in the strict sense of thicknesses below 1 mm, but also sealing membranes of the kind used typically to provide sealing to tunnels, or roofs or swimming pools, in a thickness of typically 1 to 3 mm, or even, in specific instances, in a thickness of up to a maximum of 5 mm. Polymeric films of these kinds are customarily produced by spreading, casting, extrusion or, with particular preference, by calendering, and are typically available commercially in rolls, or are produced in situ. They may have a single-layer or multilayer construction. The plastic of the polymer films is preferably a thermoplastic polymer, e.g., polyesters, such as polyethylene terephthalate (PET), thermoplastic polyolefins (TPO) such as polyethylene, oriented polypropylene (OPP), unstretched polypropylene (CPP), polyvinyl chloride, especially flexible PVC, polyacetates, ethylene/vinyl acetate copolymers (EVA), ASA (acrylonitrile/styrene/acrylate copolymers), PU (polyurethane), PA (polyamide), poly(meth)acrylates, polycarbonates, or plastics alloys of these, cellophane, metal-coated, e.g., aluminum-coated (vapor-coated) polymer films (for short: metallized films), or metal foils, made of aluminum, for example. The stated films/foils may also have been printed with printing inks, for example. Particularly preferred are rigid PVC and thermoplastic polyethylene terephthalate (PET).

Coating of the films and substrates with the adhesive may take place according to customary application techniques, as for example by spray, spread, knife, stamp, roller or casting application techniques. Spray application is preferred.

The amount of adhesive applied is preferably 0.5 to 100 $g/m^2$, more preferably 2 to 80 $g/m^2$, very preferably 10 to 70 $g/m^2$, based on adhesive. It is preferable to coat only the film or only the substrate on one side. However, it is also possible to coat both entities that are to be bonded, in other words both film and substrate. After coating has taken place, it is customary for there to be drying, preferably at room temperature or at temperatures of up to 80° C., in order to remove water or other solvents.

The adhesive may be activated thermally. The temperature in the layer of adhesive is preferably at least 30° C. or at least 40° C., for example from 30 to 200° C., or from 40 to 180° C. A particular advantage of the invention is that the adhesive can be readily activated even at temperatures below the 60-70° C. temperature range used with conventional adhesives, as for example at temperatures of less than 60° C., e.g., not more than 58° C., not more than 55° C. or not more than 50° C.

Adhesive bonding takes place preferably under pressure. For this purpose, for example, the parts to be bonded may be pressed together with a pressure of at least 0.005 or at least 0.01 or at least 0.08 $N/mm^2$, e.g., 0.005 to 5 $N/mm^2$ or 0.01 to 0.8 $N/mm^2$. The applied pressure may be generated, for example, by the application of a subatmospheric pressure between film and substrate, and/or by means of air pressure.

The method of the invention is also particularly important for the production of components for installation in vehicles. Particularly preferred is the use of the adhesive of the invention for the production of interior trim components for automobiles.

Examples of such interior trim components are internal door trim, instrument panels, dashboards, parcel shelves, ready-to-install roof systems, sliding roof systems, center consoles, gloveboxes, sun visors, columns, door handles and armrests, floor assemblies, loading-floor assemblies, and trunk assemblies, and also sleeping-cab walls and rear walls in vans and in trucks. For this purpose, in particular, a vacuum thermoforming process or a press lamination process is used in the sealing process. In the case of the vacuum thermoforming process, the adhesive is applied to the molding. This is then optionally followed by air drying, at room temperature or in a drying tunnel at preferably not more than 40° C., for example. The foil to be adhered, for example a decorative film of air-impermeable material, is typically clamped within a frame in an airtight manner. Below the film there is a lower former onto which the molding is placed. The lower former and the molding are permeable to air or have perforations. Below the equipment there is another airtight seal. When the air is drawn out of this apparatus under suction, the film then conforms accurately to the molding, under the atmospheric pressure acting on its surface. The film is heated before the vacuum, or subatmospheric pressure, is applied. On account of the vacuum, or subatmospheric pressure, that is to be produced, the film is impermeable to air. In the case of the press lamination process, the adhesive is likewise applied to the molding and optionally to the film to be bonded, but at least to the molding. This is followed optionally by air drying, typically at room temperature or in a drying tunnel at preferably not more than 40° C. The bonding of moldings to the film may take place after thermal activation, with joining and pressing. The films utilized here are often polymeric decorative films and have a surface structure. This surface structure on the polymeric film may have been impressed, for example, before, during or after adhesive bonding.

In the case of the laminating method of the invention for producing composite films, the above-described two-component adhesive or a correspondingly formulated preparation is applied to the bond substrates preferably with a layer thickness of 0.1 to 20 g/m², more preferably 1 to 7 g/m², by means, for example, of knife coating, spreading, etc. Customary coating techniques may be employed, examples being roll coating, counterrotating roll coating, gravure roll coating, counterrotating gravure roll coating, brush coating, rod coating, spray coating, airbrush coating, meniscus coating, curtain coating or dip coating. After an optional short time for evaporation of volatile constituents (preferably after 1 to 60 seconds), the coated film substrate can then be laminated with a second film substrate, and here the temperature can for example be 20 to 200° C., preferably 20 to 100° C., and the pressure, for example, can be 100 to 3000 kN/m², preferably 300 to 2000 kN/m². Examples of particularly suitable substrates for composite film lamination include polymer films, especially those of polyethylene (PE), oriented polypropylene (OPP), unstretched polypropylene (CPP), polyamide (PA), polyethylene terephthalate (PET), polyacetate, cellophane, metal-coated, e.g., aluminum-coated (vapor coated) polymer films (for short: metallized films) or metal films, of aluminum, for example. The stated films may be bonded to one another or to a film of a different type, as for example polymer films to metal films, different polymer films to one another, etc. The stated films may also, for example, have been printed with printing inks.

One embodiment of the invention is a composite film obtainable by the aforesaid laminating method, in other words produced using one of the two-component adhesives described above. The material of a first film is preferably selected from OPP, CPP, PE, PET and PA, and the material of a second film is preferably selected from OPP, CPP, PE, PET, PA and metal film. In one embodiment of the invention the first film and/or the second film is metallized or printed on the respective side which is coated with the adhesive. The thickness of the substrate films may be for example from 5 to 100 μm, preferably from 5 to 40 μm. In the case of preferred composite films, the film material is selected from the group consisting of aluminum film, printed polyester film, unprinted polyester film, printed polyamide film, unprinted polyamide film, polypropylene film, polyethylene film, and combinations thereof.

In the case of high-gloss film lamination, a first substrate is laminated to a second substrate, the first substrate being a polymer film, preferably a transparent polymer film, and the second substrate being paper, card or paperboard, with the second substrate preferably being printed and with the lamination taking place preferably under pressure and with heating. Lamination takes place in analogy to the production of the composite films. The high-gloss film laminate is produced preferably using the above-described two-component adhesive, and the material of a transparent polymer film (first substrate) is selected from oriented polypropylene (OPP), unstretched polypropylene (CPP), polyethylene (PE), polyamide (PA), polyethylene terephthalate (PET), polyacetate and cellophane, and the material of the second substrate is selected from paper, card and paperboard. A preferred polymer film used for high-gloss film lamination is a corona-treated oPP film. In one embodiment of the invention, the second substrate of the high-gloss film is colored or printed on the side which is coated with adhesive. The thickness of the polymer film may amount for example to from 5 to 100 μm, preferably from 5 to 40 μm.

The present invention is now elucidated in more detail by means of the examples below.

EXAMPLES

Example 1: Compound Having Three 2-Oxo-1,3-Dioxolane-4-Carboxamide Groups, Based on Ethoxylated/Propoxylated Glycerol

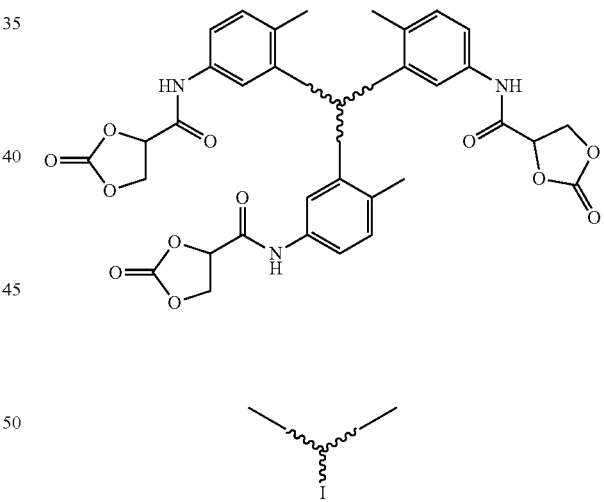

=glycerol plus EO/PO $M_{eq}$=1870 g/mol (molecular weight per cyclocarbonate group)

Under a nitrogen atmosphere, 13.94 g of toluene 2,4-diisocyanates (TDI) (0.0825 mol) and 10.56 g of 2-oxo-1,3-dioxolane-4-carboxylic acid (0.08 mol) are dissolved in 70 ml of dry THF or acetone. 0.12 g (1 mol %) of 1,8-diazabicyclo-[5.4.0]undec-7-ene (DBU) is added and the reaction mixture is stirred at room temperature for 12 hours. Removal of the solvent by evaporation gives the product as a white solid in quantitative yield.

The reaction may also take place in dry acetonitrile and with 4-DMAP as catalyst.

In the presence of DBTL (dibutyltin dilaurate, 0.02% by weight), the product obtained may be reacted with Lupranol® 2095 (trifunctional polyether polyol having primary hydroxyl end groups) to give a difunctional prepolymer. For this purpose 5.0 g (0.0195 mol) of the product are dissolved in dry THF, and 31.2 g of Lupranol® 2095 (6.52 mmol) and 1.2 mg of DBTL (0.002 mmol) are added. The reaction mixture is heated at 60° C. for 4 hours. Removal of the solvent by evaporation gives the product in the form of a viscous yellow oil.

Example 2

Compound Having Three 2-Oxo-1,3-Dioxolane-4-Carboxamide Groups, Prepared from Glycerol Carbonate Carboxylic Acid (2-Oxo-1,3-Dioxolane-4-Carboxylic Acid) and Isocyanurate-Modified Hexamethylene Diisocyanate (Basonat® HI 100)

Basonat HI 100:

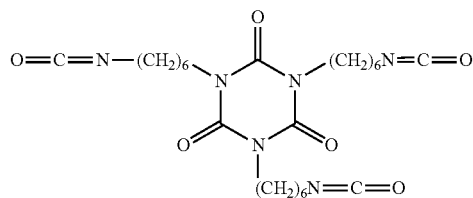

31.79 g of cyclocarbonate carboxylic acid (0.12 mol) in 80 ml of THF were introduced as an initial charge, giving a yellow solution. 0.3704 g of DMAP (4-(dimethylamino)-pyridine, 0.0012 mol) in 60 ml of THF was added. This was followed by the addition of 46.09 g of Basonat® HI100 (0.12 mol based on NCO; the NCO number of Basonat® HI 100 is 21.9%) in 80 ml of THF. This solution is stirred at room temperature for around 24 hours. The solution becomes cloudy overnight. Following removal of the THF by evaporation on a rotary evaporator, there remained 73.76 g of a yellow liquid of high viscosity. There was no NCO peak visible in the IR spectrum, and the NCO number was 1.1%.

Example 3: Two-Component Adhesives

The 2-oxo-1,3-dioxolane-4-carboxamides of example 1 and of example 2, respectively, were dissolved in THF at 23° C. and blended with different aminic hardeners (see table 1).

Immediately after mixing, the resultant reactive two-component adhesive was applied in a layer thickness of 3 μm to a printed polyester film 36 μm thick. The solvent was evaporated by means of a stream of hot air and then, in a calender, a second polyester film 36 μm thick, treated beforehand by corona, was laminated onto the layer of adhesive under a pressure of 3 bar. The resulting laminate was cut into strips 15 mm wide, and the peel strength of these strips was determined at room temperature (20° C.) after 24 hours [N/15 mm]. This was done using a tensile testing machine, with the peel strength test conducted at a tensile angle of 90° (T test). The results are reproduced in table 1.

Aminic Hardeners:
DODDA: 4,9-dioxadodecane-1,12-diamine H₂NCH₂CH₂CH₂OCH₂CH₂CH₂OCH₂CH₂CH₂NH₂
DATOTD: 1,13-diamino-4,7,10-trioxatridecane H₂NCH₂CH₂CH₂OCH₂CH₂OCH₂CH₂OCH₂CH₂CH₂NH₂
DAP: 1,3-diaminopropane, H₂NCH₂CH₂CH₂NH₂

TABLE 1

Adhesive compositions and results of the peel strength measurements

| Example | 2-Oxo-1,3-dioxolane-4-carboxamides | Aminic hardener | Peel strength 24 h [N/15 mm] |
|---------|------------------------------------|-----------------|------------------------------|
| 3.1 | 1872 g example 1 | 102 g DODDA | 3.1 |
| 3.2 | 1872 g example 1 | 110 g DATOTD | 4.5 |
| 3.3 | 1872 g example 1 | 37 g DAP | 3.3 |
| 3.4 | 280 g example 2 | 240 g Polyetheramine D 400 | 3.4 |
| 3.5 | 280 g example 2 | 37 g DAP | 0.3 |
| 3.6 Comparative | 40 g Liofol® UR7732 | 60 g Liofol® UR 6084 | 3.6 |

Liofol ® UR7732/Liofol ® UR 6084: two-component polyurethane laminating adhesive composed of isocyanate-based binder (Liofol ® UR7732) and polyol hardener (Liofol ® UR 6084)

Especially suitable for industrial usefulness is a peel strength of greater than 1.5 N after 24 hours for applications of the adhesive in flexible packaging and for composite film lamination.

What is claimed is:

1. A method for preparing a two-component adhesive, the method comprising:
   introducing a compound having n 2-oxo-1,3-dioxolane-4-carboxamide units as a reactive component into the two-component adhesive, wherein the compound having n 2-oxo-1,3-dioxolane-4-carboxamide units is represented by formula (I)

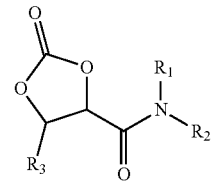

where
$R_1$ and $R_3$ independently of one another are H or an organic radical; and
$R_2$ is an n-valent organic radical which is substituted by n−1 further 2-oxo-1,3-dioxolane-4-carboxamide groups
where n is a number greater than 2,
wherein the 2-oxo-1,3-dioxolane-4-carboxamide is a compound of formula (VII)

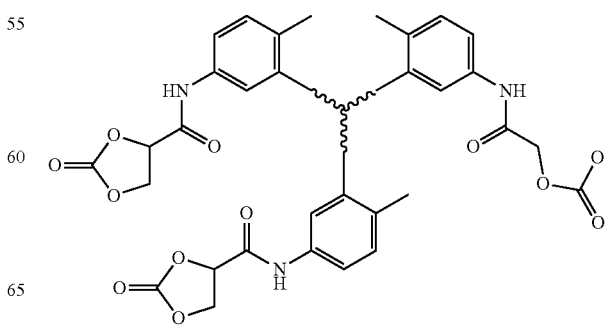

where

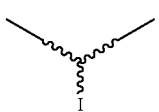

is an alkoxylated glycerol radical having 2 to 5 C atoms in the alkoxy group, introducing a polyfunctional curing agent compound into the two-component adhesive, wherein the curing agent is selected from the group consisting of a polyamine which has two or more amine groups and a polyol which has two or more alcoholic hydroxyl groups.

2. The method according to claim 1, wherein in the formula (I)

$R_1$ is H, and $R_3$ is H.

3. The method according to claim 1, wherein at least one of the compound having n 2-oxo-1,3-dioxolane-4-carboxamide units and the curing agent compound comprises at least one linear or branched spacer group having a molecular weight of at least 200 g/mol.

4. A two-component adhesive, comprising at least one compound having n 2-oxo-1,3-dioxolane-4-carboxamide units as a reactive, first component;

wherein the compound having n 2-oxo-1,3-dioxolane-4-carboxamide units is represented by formula (I)

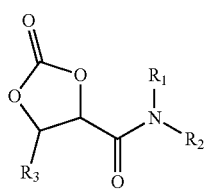

where $R_1$ and $R_3$ independently of one another are H or an organic radical; and $R_2$ is an n-valent organic radical which is substituted by n−1 further 2-oxo-1,3-dioxolane-4-carboxamide groups, and at least one curing agent compound selected from the group consisting of a polyamine having two or more amine groups and a polyol having two or more alcoholic hydroxyl groups as a second component;

wherein n is a number greater than 2, where either the compound having n 2-oxo-1,3-dioxolane-4-carboxamide units or the curing agent compound or both comprises at least one linear or branched flexible spacer group, where the flexible spacer group has a molecular weight of at least 200 g/mol; wherein the 2-oxo-1,3-dioxolane-4-carboxamide is a compound of formula (VII)

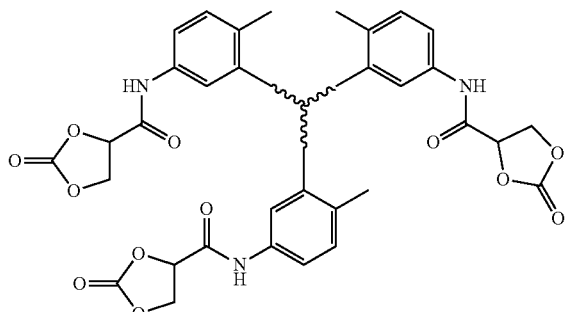

where

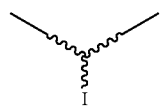

is an alkoxylated glycerol radical having 2 to 5 C atoms in the alkoxy group, wherein the two-component adhesive has a bond strength of greater than 1.5 N/15 mm, measured as the peel strength of two polyester films bonded to one another with a 3 μm layer of adhesive and with an applied pressure of 3 bar after 24 hours.

5. The two-component adhesive according to claim 4, which at a temperature of 70° C. or below has a Brookfield viscosity of less than 10 000 mPa s, measured at 12 rpm with spindle 3.

6. The two-component adhesive according to claim 4, further comprising at least one catalyst for catalyzing the reaction of cyclocarbonate groups with the functional groups of the curing agent.

7. A method for bonding two substrates to one another, the method comprising:

applying a two-component adhesive to a surface of at least one of the substrates, wherein the method for bonding is a laminating method producing laminated articles selected from high-gloss films, composite films, and laminated moldings, where a) a first substrate is provided in the form of a first film, b) a second substrate is provided, selected from paper, a second film, which may be identical to or different from the first film, and moldings, c) the two-component adhesive is applied to the first substrate and/or to the second substrate, and is optionally allowed to dry, and the first substrate is laminated onto the second substrate, wherein the lamination may optionally take place with thermal activation;

wherein the two component adhesive comprises at least one compound having n 2-oxo-1,3-dioxolane-4-carboxamide units as a reactive component, wherein the compound having n 2-oxo-1,3-dioxolane-4-carboxamide units is represented by formula (I)

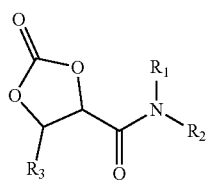

where
$R_1$ and $R_3$ independently of one another are H or an organic radical; and
$R_2$ is an n-valent organic radical which is substituted by n−1 further 2-oxo-1,3-dioxolane-4-carboxamide groups,
and n is a number greater than 2,
wherein the 2-component lamination adhesive has a bond strength of greater than 1.5 N/15 mm, measured as the peel strength of two polyester films bonded to one another with a 3 μm layer of adhesive and with an applied pressure of 3 bar after 24 hours;
wherein a polyfunctional curing agent compound is used as a second component of the two-component adhesive and is selected from polyamines which have two or more amine groups and polyols which have two or more alcoholic hydroxyl groups;
wherein either the compound having n 2-oxo-1,3-dioxolane-4-carboxamide units or the curing agent compound or both comprise at least one linear or branched flexible spacer group, where the flexible spacer group has a molecular weight of at least 200 g/mol; wherein the 2-oxo-1,3-dioxolane-4-carboxamide is a compound of formula (VII)

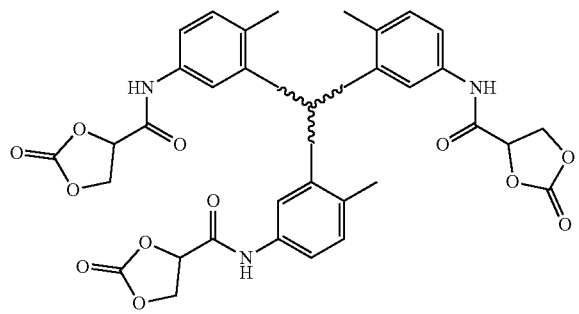

where

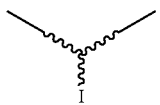

is an alkoxylated glycerol radical having 2 to 5 C atoms in the alkoxy group.

8. A film-laminated article, produced by the method according to claim 7.

9. A 2-oxo-1,3-dioxolane-4-carboxamide of formula (1)

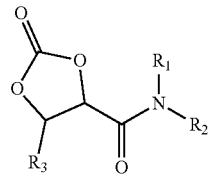

where
$R_1$ and $R_3$ independently of one another are H or an organic radical; and
$R_2$ is an n-valent organic radical which is substituted by n−1 further 2-oxo-1,3-dioxolane-4-carboxamide groups,
n is a number greater than 2, and
where between the 2-oxo-1,3-dioxolane-4-carboxamide groups there is at least one linear or branched spacer group having a molecular weight of at least 200 g/mol, wherein the 2-oxo-1,3-dioxolane-4-carboxamide is a compound of formula (VII)

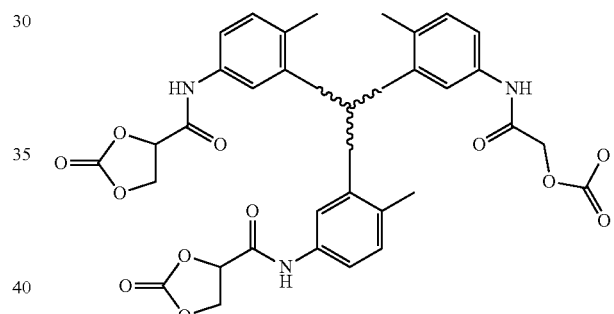

where

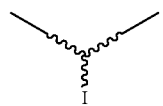

is an alkoxylated glycerol radical having 2 to 5 C atoms in the alkoxy group.

* * * * *